United States Patent
Schultheiss et al.

(10) Patent No.: US 6,678,004 B1
(45) Date of Patent: Jan. 13, 2004

(54) METHODS AND SYSTEMS FOR PROVIDING INFORMATION TO A PLURALITY OF SET-TOP BOXES VIA A PERSONAL COMPUTER USING SET-TOP BOX IDENTIFIERS

(75) Inventors: Christopher J. Schultheiss, 419 Quay Assisi St., New Smyrna Beach, FL (US) 32169; Todd D. Cutler, Howe, TX (US)

(73) Assignees: Douglas G. Brown, Cherryville, NC (US); Christopher J. Schultheiss, New Smyrna Beach, FL (US)

( * ) Notice: Subject to any disclaimer, the term of this patent is extended or adjusted under 35 U.S.C. 154(b) by 0 days.

(21) Appl. No.: 09/370,561

(22) Filed: Aug. 9, 1999

Related U.S. Application Data

(63) Continuation-in-part of application No. 09/005,269, filed on Jan. 9, 1998.

(51) Int. Cl.[7] .............................................. H04N 7/173
(52) U.S. Cl. ....................... 348/552; 348/734; 725/133; 725/153; 725/80
(58) Field of Search ................................. 348/552, 906, 348/14.04, 734; 345/717, 718, 719; 725/51, 100, 109, 110, 139, 153, 141, 82, 80, 81, 79, 78, 74, 133; 709/217, 218, 219

(56) References Cited

U.S. PATENT DOCUMENTS

| | | | |
|---|---|---|---|
| 4,688,249 A | 8/1987 | Hayes et al. | 380/20 |
| 4,706,121 A | 11/1987 | Young | 358/552 |
| 4,751,578 A | 6/1988 | Reiter et al. | 358/183 |

(List continued on next page.)

FOREIGN PATENT DOCUMENTS

| | | |
|---|---|---|
| EP | 0727909 A2 | 8/1996 |
| EP | 0822718 A1 | 2/1998 |
| WO | WO 96/17473 | 6/1996 |
| WO | WO 97/13368 | 4/1997 |
| WO | WO 97/20413 | 6/1997 |
| WO | WO 97/48228 | 12/1997 |
| WO | WO 97/48230 | 12/1997 |
| WO | WO 97/49242 | 12/1997 |
| WO | WO 98/03012 | 1/1998 |
| WO | WO 99/35831 | 7/1999 |

OTHER PUBLICATIONS

International Search Report, PCT/US00/02303, dated Jul. 13, 2000.
U.S. patent application Ser. No. 08/678,772, Schultheiss, filed Jul. 11, 1996.
International Search Report, PCT/US99/00461, Apr. 28, 1999.
International Search Report, PCT/US97/12166, Nov. 11, 1997.

*Primary Examiner*—Michael H. Lee
*Assistant Examiner*—Jean W. Désir
(74) *Attorney, Agent, or Firm*—Myers Bigel Sibley & Sajovec

(57) ABSTRACT

A set-top box is provided wherein an Identifier (ID) associated with the set-top box can be used to request information from a personal computer which provides the requested information to the set-top box. In particular, in a system that includes multiple set-top boxes, the ID can be used to determine which set-top box made a request and to determine which set-top box is the intended recipient of the requested information accessed by the system. For example, a request for information from a set-top box can include the ID of the set-top box. The personal computer, therefore, can use the ID to record which set-top box made the request. When the personal computer receives the information requested by the set-top box, the information and the ID of the set-top box that made the request is broadcast to all the set-top boxes. Each set-top box compares the ID broadcast with the information to its own ID to determine if the information is intended for it.

32 Claims, 10 Drawing Sheets

U.S. PATENT DOCUMENTS

| | | | | |
|---|---|---|---|---|
| 4,907,079 A | 3/1990 | Turner et al. | | 358/84 |
| 5,014,128 A | 5/1991 | Chen | | 358/160 |
| 5,065,425 A | 11/1991 | Lecomte et al. | | 379/93 |
| 5,101,499 A | 3/1992 | Streck et al. | | 455/4 |
| 5,138,649 A | 8/1992 | Krisbergh et al. | | 379/56 |
| 5,192,999 A | 3/1993 | Graczyk et al. | | 358/85 |
| 5,249,164 A | 9/1993 | Koz | | 358/21 R |
| 5,251,301 A | 10/1993 | Cook | | 395/200 |
| 5,255,086 A | 10/1993 | McMullan, Jr. et al. | | 358/86 |
| 5,283,819 A | 2/1994 | Glick et al. | | 379/90 |
| 5,293,357 A | 3/1994 | Hallenbeck | | 348/734 |
| 5,339,095 A | 8/1994 | Redford | | 345/158 |
| 5,359,367 A | 10/1994 | Stockill | | 348/552 |
| 5,361,091 A | 11/1994 | Hoarty et al. | | 348/7 |
| 5,396,546 A | 3/1995 | Remillard | | 379/96 |
| 5,421,030 A | 5/1995 | Baran | | 455/5.1 |
| 5,461,667 A | 10/1995 | Remillard | | 379/96 |
| 5,485,221 A | 1/1996 | Banker et al. | | 348/563 |
| 5,488,412 A | 1/1996 | Majeti et al. | | 348/10 |
| 5,570,415 A | 10/1996 | Stretton et al. | | 379/110 |
| 5,600,364 A | 2/1997 | Hendricks et al. | | 348/12 |
| 5,606,361 A | 2/1997 | Davidsohn et al. | | 348/14 |
| 5,608,446 A * | 3/1997 | Carr et al. | | 725/114 |
| 5,619,251 A | 4/1997 | Kuroiwa et al. | | 348/12 |
| 5,636,211 A | 6/1997 | Newlin et al. | | 370/465 |
| 5,648,781 A | 7/1997 | Choi | | 341/146 |
| 5,657,414 A | 8/1997 | Lett et al. | | 386/35 |
| 5,675,390 A | 10/1997 | Schindler et al. | | 348/552 |
| 5,703,636 A | 12/1997 | Cifaldi | | 348/14 |
| 5,706,334 A | 1/1998 | Balk et al. | | 379/67 |
| 5,760,824 A | 6/1998 | Hicks, III | | 348/14 |
| 5,812,931 A | 9/1998 | Yuen | | 455/5.1 |
| 5,961,603 A | 10/1999 | Kunkel et al. | | 709/229 |
| 5,990,927 A | 11/1999 | Hendricks et al. | | 348/6 |
| 5,999,970 A | 12/1999 | Krisbergh et al. | | 709/217 |
| 6,005,861 A * | 12/1999 | Humpleman | | 370/352 |
| 6,018,768 A | 1/2000 | Ullman et al. | | 348/12 |
| 6,038,625 A | 3/2000 | Ogino et al. | | 710/104 |
| 6,049,823 A * | 4/2000 | Hwang | | 725/82 |
| 6,052,554 A | 4/2000 | Hendricks et al. | | 455/5.1 |
| 6,057,886 A * | 5/2000 | Van Gestel | | 370/476 |
| 6,061,719 A | 5/2000 | Bendinelli et al. | | 709/218 |
| 6,064,440 A | 5/2000 | Born et al. | | 348/478 |
| 6,084,638 A | 7/2000 | Hare et al. | | 348/552 |
| 6,108,696 A | 8/2000 | Mendhekar et al. | | 709/217 |
| 6,128,484 A | 10/2000 | Singkornrat et al. | | 455/420 |
| 6,175,861 B1 * | 1/2001 | Williams, Jr. et al. | | 709/217 |
| 6,192,399 B1 * | 2/2001 | Goodman | | 725/78 |
| 6,208,384 B1 * | 3/2001 | Schultheiss | | 345/719 |
| 6,233,736 B1 * | 5/2001 | Wolzien | | 725/110 |
| 6,249,914 B1 * | 6/2001 | Harrison et al. | | 348/552 |
| 6,286,142 B1 * | 9/2001 | Ehreth | | 725/78 |
| 6,321,382 B1 * | 11/2001 | Wugofski | | 725/100 |
| 6,493,875 B1 * | 12/2002 | Eames et al. | | 725/81 |
| 6,507,951 B1 * | 1/2003 | Wugofski | | 725/59 |

* cited by examiner

PACKET FORMAT

| START | ID | INSTR | LENGTH | [DATA] | CKSUM | STOP |
|---|---|---|---|---|---|---|
| BYTE | WORD | BYTE | WORD | nBYTES | WORD | BYTE |

METHODS AND SYSTEMS FOR PROVIDING INFORMATION TO A PLURALITY OF SET-TOP BOXES VIA A PERSONAL COMPUTER USING SET-TOP BOX IDENTIFIERS

CROSS REFERENCE TO RELATED APPLICATION

This application is a continuation-in-part of application Ser. No. 09/005,269, filed Jan. 9, 1998, entitled Methods and Systems for Providing Television Related Services via a Networked Personal Computer.

FIELD OF THE INVENTION

The present invention relates to the field of television in general, and more particularly, to set-top boxes for televisions.

BACKGROUND OF THE INVENTION

The television (TV) has become ubiquitous in modern society. As a result, a variety of services are being provided via TV. Many of the services are provided using a set-top box that works in conjunction with the TV to provide the desired service. One example of a service provided via a TV is an online TV program guide, wherein TV program schedule information is displayed on a TV for searching and selection by a viewer. Online TV program guides are described in U.S. Pat. No. 4,751,578 to Reiter et. al. Entitled "System for Electronically Controllable Viewing on a Television Updateable Television Programming Information." Other popular services are also provided using a set-top box. For example cable or satellite TV may be provided using a tuner packaged as a set-top box. The tuner decodes the transmission from the service provider and formats the signal for display on the TV. Moreover, many households have more than one TV.

It is also known to provide some services over the Internet using set-top boxes. One such service is WebTV which enables a user to browse the Web using a TV as the display. WebTV, however, duplicates much of the hardware and software included in a standard PC. For example, WebTV includes a modem while many PCs come equipped with one. Consequently, the consumer who already owns a PC may pay the cost of the modem twice: once when buying the PC and a second time when buying WebTV. Furthermore, WebTV may also duplicate a portion of the functions found in most TVs. This duplication of PC and TV components may make WebTV unnecessarily expensive or complex to the many consumers who already own a PC.

Moreover, as the popularity of TV and services increase, it may become more desirable to provide multiple users in the same household with the capability to use services separately. Unfortunately, the cost to provide multiple TV users separate access to the services described above may be prohibitive. For example, viewers of different TVs may desire separate information. Consequently, there is a need to provide improved methods and systems for providing television services to multiple TVs in a household.

SUMMARY OF THE INVENTION

It is an object of the present invention to provide improved set-top boxes for use with television services.

It is another object of the present invention to provide improved systems for the use of multiple set-top boxes.

These and other objects of the present invention are provided by set-top boxes, identified by respective identifiers (IDs), that send requests for information a PC over a communications link. The requests include the ID of the set-top box that made the request. When the requested information is accessed, the requested information and the ID of the set-top box that made the request are transmitted over the communications link to the set-top box. Accordingly, multiple set-top boxes may access information from a single residence via an existing PC, thereby allowing a more cost-effective approach than conventional systems.

In one embodiment, a computer program running on the PC handles requests from the plurality of set-top boxes. In another embodiment, a computer program is instantiated for each of the plurality of set-top boxes. For example, a first computer program is instantiated to handle requests from the first set-top box and a second computer program is instantiated to handle requests from the second set-top box.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiments set forth herein; rather these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system and/or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

The present invention is also described using block diagrams and flowcharts. Those skilled in the art will understand that each block of the block diagrams and flowchart illustrations, and combinations of blocks in the flowchart illustrations and block diagrams, may be implemented with various commonly used components. It will also be understood that portions of the operations described in the flowchart illustrations may be executed as computer program instructions loaded into a computer or other data processing apparatus, thus producing a machine which provides means for implementing the functions specified in the flowchart blocks and combinations thereof. The computer program may cause operational steps to be performed on the computer or data processing apparatus to produce a computer-implemented process such that the instructions which execute on the computer or data processing apparatus provide steps for implementing the functions of the flowchart blocks or combinations thereof. Accordingly, blocks of the flowchart illustrations support combinations of means for performing the specified functions and combinations of steps for performing the specified functions.

Figure 1:
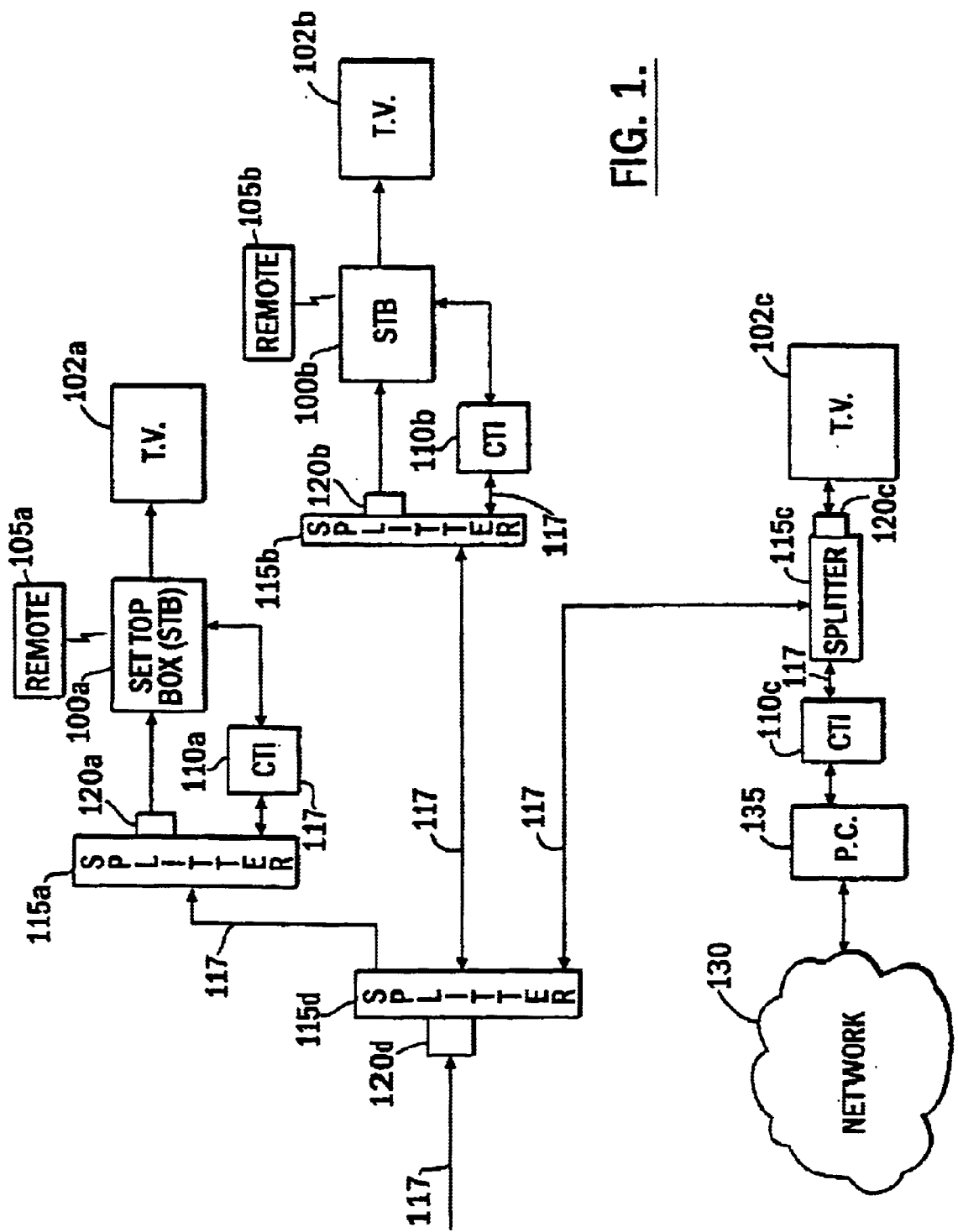
FIG. 1 is a block diagram of a first embodiment of a system and method according to the present invention.
Figure 2:
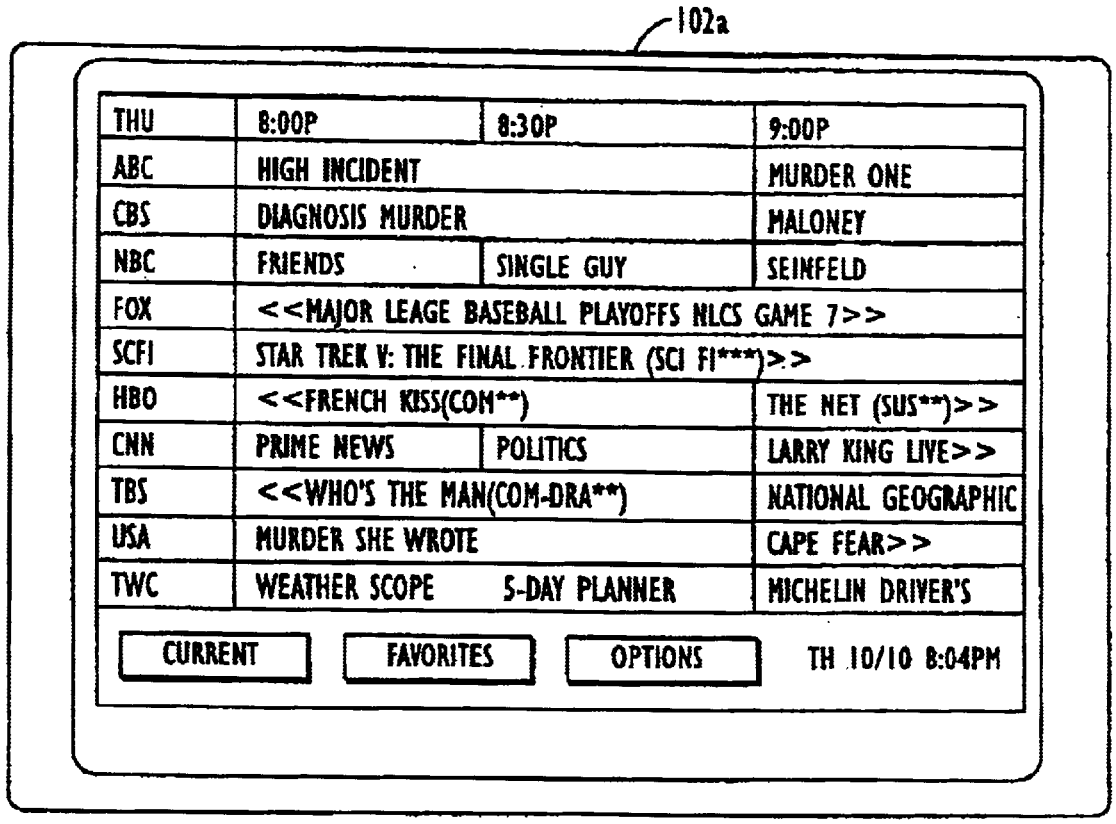
FIG. 2 is an exemplary display of information provided to a user on a TV.

FIG. 1 is a block diagram of a first embodiment of a system and method according to the present invention. According to the present invention, the system includes a plurality of set-top boxes $100a-b$, each of which accepts requests from respective remote controls $105a-b$. According to FIG. 1, a user pushes buttons on the remote control $105a$ to request the display of information on a TV $102a$. The remote control $105a$ transmits a corresponding command to the set-top box $100a$ associated with the remote control. The set-top box $100a$ sends a request for the information to a Personal Computer (PC) $135$ over a communications link. Each set-top box $100a-b$ can request different information from the PC $135$, which responds by accessing the requested information locally or via a network $130$, such as the Internet. As used herein, the term "information" includes information such as television program information (such as that shown in FIG. 2), e-mail, chat, sports scores, weather and the like. Set-top boxes are discussed in U.S. patent application Ser. No. 09/005269 entitled Methods and Systems for Providing Television Related Services via a Networked Personal Computer" which is commonly assigned to the assignee of the present application and which is incorporated herein by reference.

Each request for information by a set-top box $100a-b$ includes an Identifier (ID) that identifies the set-top box $100a-b$ which made the request. For example, the first set-top box $100a$ can be identified by a first ID of $FF_{16}$ and the second set-top box $100b$ can be identified by a second ID of $F0_6$. Requests sent to the PC $135$ by the first set-top box $100a$ include the first ID $FF_{16}$ and requests sent to the PC $135$ by the second set-top box $100b$ includes the second ID $F0_{16}$. The PC $135$ uses the respective IDs of the first and second set-top boxes $100a-b$ to associate each received request with the set-top box that sent the request.

The PC $135$ accesses the requested information and broadcasts the requested information and the ID of the set-top box $100a-b$ that made the request over the communications link. For example, the PC $135$ broadcasts information requested by the first set-top box $100a$ with the first ID $FF_{16}$ and broadcasts information requested by the second set-top box $100b$ with the second ID $F0_{16}$ over the communications link.

Each set-top box $100a-b$ receives the information and the associated ID broadcast by the PC $135$. Each set-top box $100a-b$ compares the ID included with the information broadcast by the PC $135$ to the ID stored in the set-top box $100a-b$. For example, when the PC $135$ broadcasts the information requested by the first set-top box $100a$, the PC $135$ includes the first ID. Accordingly, the first set-top box $100a$ compares the ID associated with the first information broadcast by the PC $135$ to the ID associated with the first set-top box $100a$. When a match occurs, the first set-top box $100a$ accepts the information and provides it to the TV $102a$. Moreover, the second-set-top box $100b$ compares the ID associated with the first information broadcast by the PC $135$ to the ID associated with the second set-top box $100b$. When a mismatch occurs, the second set-top box $100b$ does not accept the information.

The communications link can be any communications medium known to those having skill in the art. In one embodiment, the communications link is a cable $117$ such as those used to provide cable service to residential systems. Each set-top box $100a-b$ and the PC $135$ is coupled to the cable $117$ via respective Cable Transfer Interfaces (CTI) $100a-c$. In particular, each set-top box $100a-b$ sends requests for information over the cable $117$ through a respective CTI $110a-b$. The PC $135$ receives the requests and broadcasts requested information through the associated CTI $100c$. The cable $117$ couples the CTIs $110a-c$ through cable splitters a–d. The cable splitters $115a-d$ can be used to distribute an input signal to multiple outputs while maintaining the proper termination for the cable $117$. Direct Current (DC) blocking circuits $120a-d$ are used to filter DC voltage levels provided by some cable systems and fed back by some TVs and set-top boxes on the cable $117$. Cable Transfer Interfaces are described in U.S. patent application Ser. No. 09/239,215 filed Jan. 28, 1999, which is commonly assigned to the present assignee and entitled "Methods and Circuits Using Frequency Shift Keying Modulation to Transfer Data Over Transmission Lines Simultaneous with Television Signals" which is incorporated herein by reference.

The set-top box $100a$ requests the information by sending requests to the PC $135$ and receives the corresponding information from the PC $135$ over the communications link according to a command protocol described herein. User commands received from the remote control $105a$ are processed by the set-top box $100a$ to determine what action is necessary to display the desired information. If the requested information is not available within set-top box $100a$, the set-top box $100a$ sends a request for the information to the PC $135$. In response, the information requested by the set-top box $100a$ is broadcast over the communications link by the PC $135$ and received by the appropriate set-top box $100a$ which formats the information for display on the TV $102a$.

Figure 3:
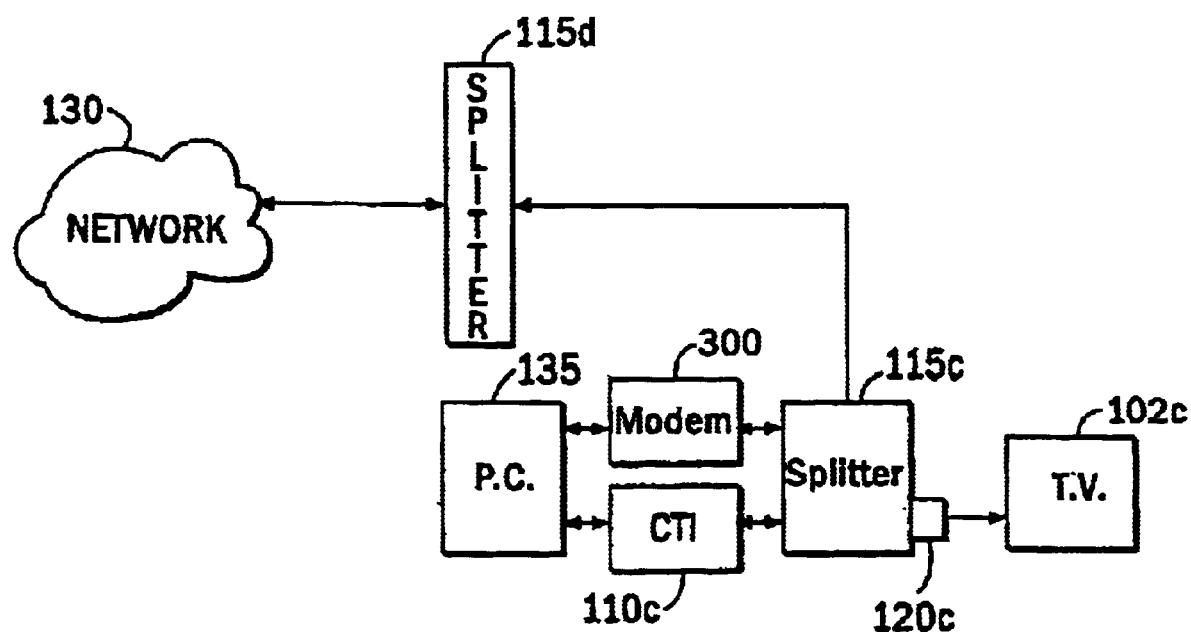
FIG. 3 is a block diagram of a second embodiment of a system and method according to the present invention.

A request can include computer commands organized to access the information requested by the user via the remote control $105a$. For example, the request may comprise a list of instructions which cause the PC $135$ to access the network $130$ and issue some of the commands included in the request to the network $130$. In one embodiment, the access to the network is provided using a telephone line. In the alternate embodiment of FIG. 3, access to the network is provided by the cable system via a cable modem $300$.

Figure 4:
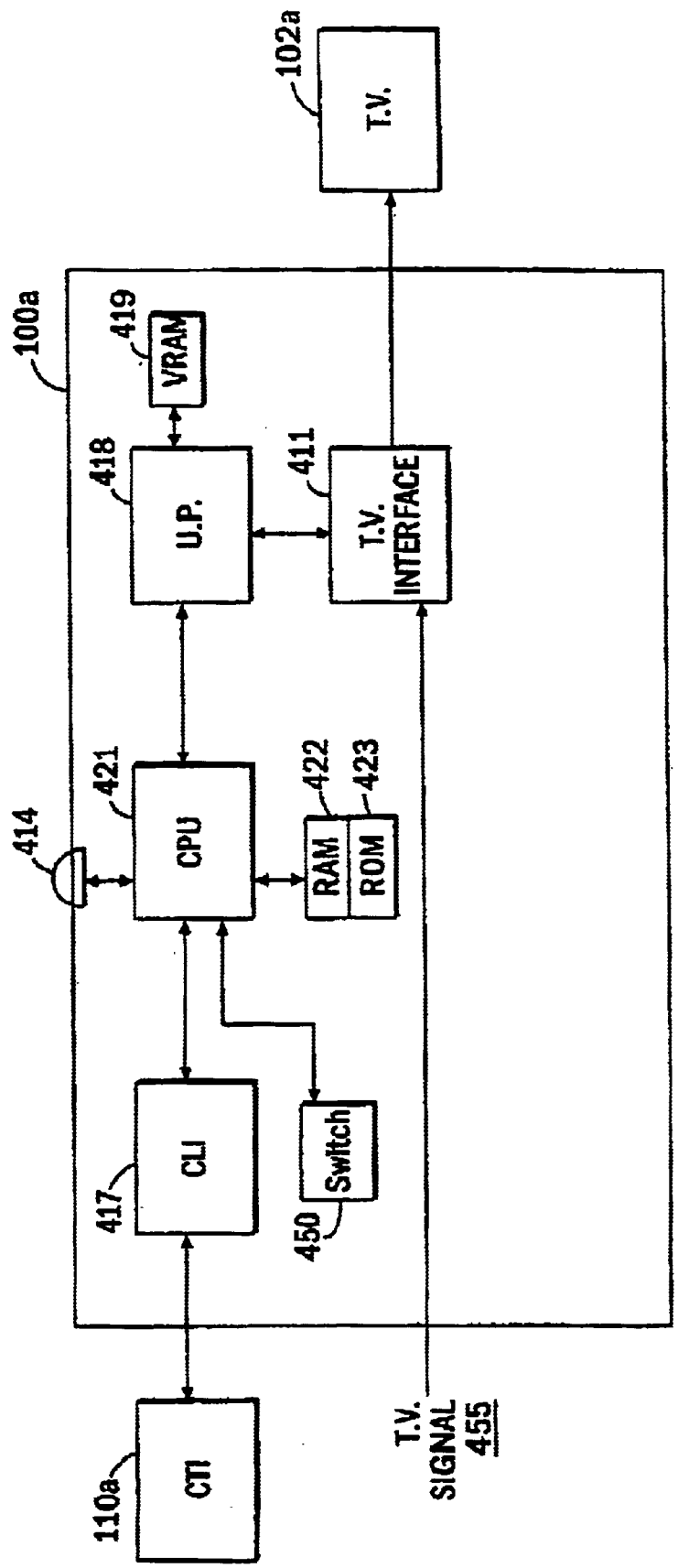
FIG. 4 is a block diagram of an embodiment of a set-top box according to the present invention.

As shown in FIG. 4, the set-top box $100a$ can include a central processing unit (CPU) or controller $421$, a Random Access Memory (RAM) $422$, a Read Only Memory (ROM) $423$, a Video Processing system (VP) $418$, a Video Buffer (VRAM) $419$, a TV interface $411$, a Communication Link Interface (CLI) $417$, and a wireless infra-red (IR) sensor 414. In one embodiment, the ID of the set-top box 100a is stored in the ROM 423. In another embodiment, the ID is encoded by switches 450, the settings of which can be read by the CPU 421. The above components are well known to those having skill in the art and need not be described further herein.

The CPU 421 may be suitable for running a computer program to process information from the PC 135, processes user commands from the remote control 105a, control the formatting of information for display on the TV 102a, and provide general system services to the set-top box 100a. The CPU 421 may process user commands received from the remote control 105a as a stream of serial data. For example, if the user pushes a button on the remote control 105a that corresponds to a command requiring information from the network 130, the CPU 421 receives the command in an internal serial buffer from the IR sensor 415. The CPU 421 sends a corresponding computer command to the CLI 417 and the command is transmitted over communications link to the PC 135 via the CTI 100a and the network 130. The CPU 421 may also process information from the PC 135. For example, when information is returned from the network 130, it is received by the CLI 417. The CPU 421 accepts the information from the CLI 417 as a stream of serial data. In one embodiment, the CPU 421 may process the data received from the remote control 105a and information from the PC 135 and the network 130 as a single serial data stream.

The VP 418 may be used by the CPU 421 to combine information from the PC 135 with a TV signal 455 for display on the TV 102a or select between the two for display. The data from the VP 418 may be represented in RGB format wherein a first portion of the data represents red information, a second portion represents green information, and a third portion represents blue information. The VP 418 may be implemented with a YVG606 Video Processor manufactured by Yamaha Inc.

The wireless IR sensor 414 receives user commands from the remote control 105a. The wireless IR sensor 414 provides the user commands from the remote control 105a to the CPU 421 for processing. The user commands can be processed by the CPU 421 as a serial data stream.

The PC 135 examines the request from the set-top box 100a to determine which set-top box 100a–b is requesting the information. In one embodiment, a computer program running on the PC 135 handles the requests from the set-top boxes 100a–b in an integrated fashion. For example, the computer program can record each request and the ID of the set-top box 100a–b which made the request in a table or using other techniques known to those having skill in the art. The computer program may cause the PC 135 to access the requested information and broadcast the requested information and the ID associated with the request over the cable 117. For example, if the computer program determines that the requested information should be accessed via the Internet, the computer program causes the PC 135 to access and request the information from the Internet. When the requested information is provided to the computer program from the Internet, the computer program looks up the request in the table to determine which set-top box 100a–b requested the information and broadcasts the requested information and the associated ID on the cable 117.

Requests from the set-top box 100a–b are handled in view of the context in which the requests are made. For example, if the first set-top box 100a is presently displaying an e-mail session, subsequent requests are handled in the context of an e-mail session. In particular, the screen being currently displayed by the set-top box 100a and the keyboard input can be included in the context of the requests.

The computer program can combine requests from multiple set-top boxes 100a–b to the network. For example, if a first set-top box 100a sends a first request for first information and a second set-top box 100b sends a second request for second information, the computer program combines the two requests into a single request to the network 130 using techniques known to those having skill in the art.

In another embodiment of the present invention, the PC 135 instantiates a plurality of computer programs, wherein each of the plurality of computer programs instantiated is associated with one of the set-top boxes 100a. In this embodiment, an interface program running on the PC 130 interfaces the plurality of computer programs to the network 130. For example, in a situation where the first and second set-top boxes 100a–b are being used, respective first and second computer programs are instantiated to handle requests from the set-top boxes 100a–b. Accordingly, when the first and second set-top boxes 100a–b request information from the network 130, the interface program coordinates access to the network 130.

Figures 5, 6:
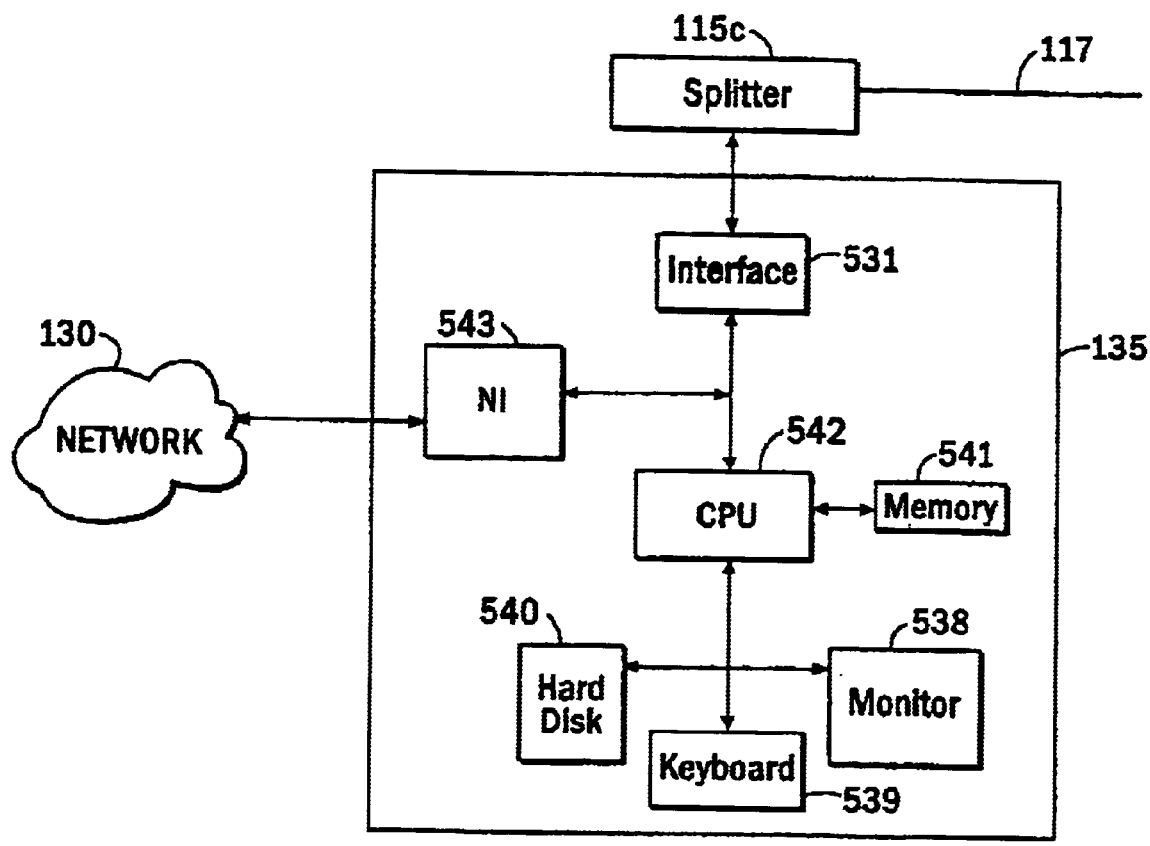
FIG. 5 is a block diagram of an embodiment of a PC according to the present invention.
FIG. 6 is an embodiment of a packet structure according to the present invention.

According to FIG. 5, the PC 135 can be a computer capable of running a wide range of applications software and may include a CPU 542, a memory 541, a network interface 543, a hard disk drive 540, an interface 531, a keyboard 539, a monitor 538 and other hardware and software components commonly found in personal computers. For example, the PC 135 may be implemented using a Pentium microprocessor marketed by Intel running the Windows 98 Operating System marketed by Microsoft Inc. The PC 135 processes the requests for information received from the set-top boxes 100a–b over the cable 117 via the CTI 115c, accesses the requested information which is broadcast over the cable 117 through the CTI 115c.

Requests by the set-top boxes 100a–b and information broadcast by the PC 135 can be structured in a packet format as illustrated in FIG. 6. Accordingly, requests for the set-top boxes 100a–b can be referred to as request packets, and requested information broadcast by the PC 135 can be referred to as information packets. The packet format of FIG. 6 includes a START byte, an ID word, an INSTR byte, a LENGTH word, a number of DATA bytes, a CKSUM word, and a STOP byte. The Start byte signals the start of the packet. In a particular embodiment, the START byte is the value $FF_{16}$. The ID word corresponds to the ID associated with the set-to box 100a–b. In one embodiment, the ID word is the least significant word of the serial number of the set-top box.

The INSTR byte can be an instruction or command to be executed by the set-top box 100a. The LENGTH word can be the number of bytes contained in the DATA field. The DATA is a number of data bytes associated with the INSTR field. For example, if a particular command or instruction has associated data or parameters, the data is stored in the DATA field. The number of data bytes included in the DATA field is described by the LENGTH field. The CKSUM is the least significant word of the sum of each byte contained in the INSTR, LENGTH, and DATA fields. The STOP byte signals the end of the packet. In a particular embodiment, the STOP byte is the value $FF_{16}$.

Figure 7:
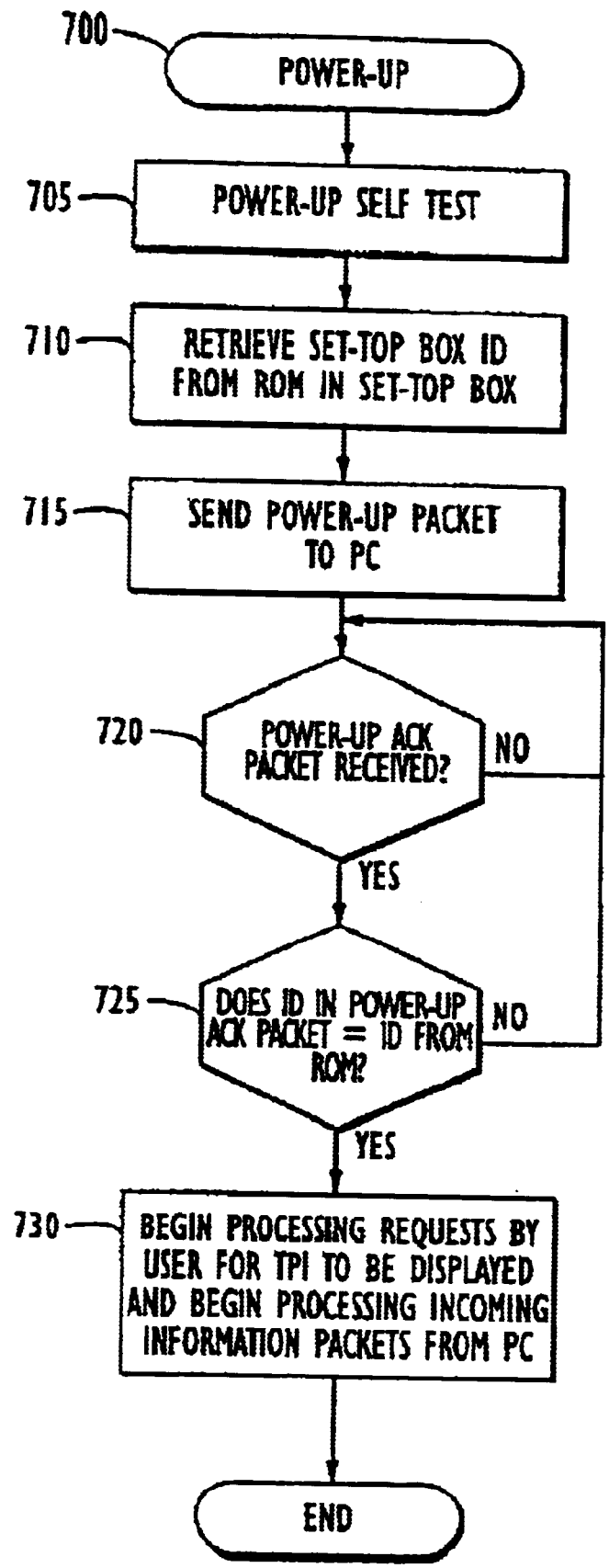
FIG. 7 is a flowchart that illustrates initialization operations of a set-top box according to the present invention.

FIG. 7 is a flowchart that illustrates initialization operations of the set-top box according to the present invention. When the user powers the set-top box up (block 700) a self test is performed (block 705). The ID of the set-top box is determined and a power-up packet is sent to the PC (block 715). The power-up packet signals the PC that the set-top box has been turned on and may provide requests for information. The set-top box waits for an acknowledgement packet from the PC (block 720). The acknowledgement packet signals the set-top box that the power-up packet was recognized by the PC.

When the acknowledgement packet is received from the PC (block 725) the set-top box begins processing requests from the user for information to be displayed and begins processing information packets broadcast by the PC (block 730).

Figure 8:
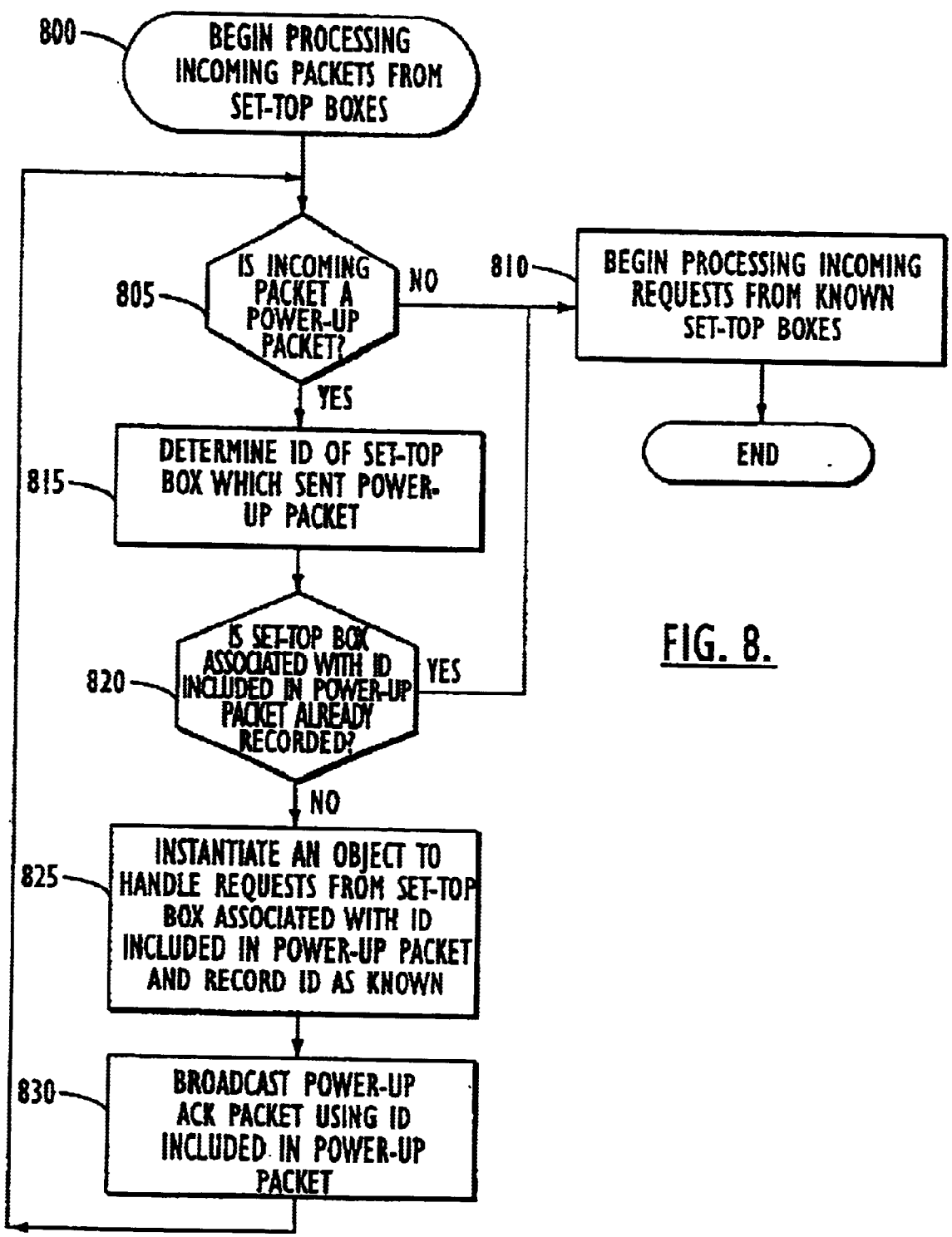
FIG. 8 is a flowchart that illustrates initialization operations of a computer program running on the PC in coordination with the operations illustrated in FIG. 7.

FIG. 8 is a flowchart that illustrates initialization operations of a computer program running on the PC in coordination with the initialization operations illustrated in FIG. 7. The computer program begins processing incoming requests from the set-top boxes in block 800. A determination is made as to whether an incoming packet is a power-up packet from a set-top box (block 805). If the incoming packet is not a power-up packet, the packet is processed as a request packet from a known set-top box as shown in FIG. 9 (block 810).

If the packet is a power-up packet, the ID associated with the power-up packet is determined (block 815) and the ID is compared to the IDs of all known set-top boxes (block 820). If the ID included in the power-up packet is the same as an ID associated with a known set-top box, operations continue with the processing of incoming request packet (block 810). If the ID included in the power-up packet is not known, the ID is recorded as an ID associated with a known set-top box and a computer program according to the present invention is instantiated (block 825). In particular, request packet from the set-top box associated with the ID included in the power-up packet above are handled by the instantiated computer program. Accordingly, a computer program may be instantiated for each known set-top box. A power-up acknowledgement packet is broadcast on the communications link (block 830) and the operations continue, wherein a determination is made as to whether an incoming packet is a power-up packet from a set-top box (block 805).

Figure 9:
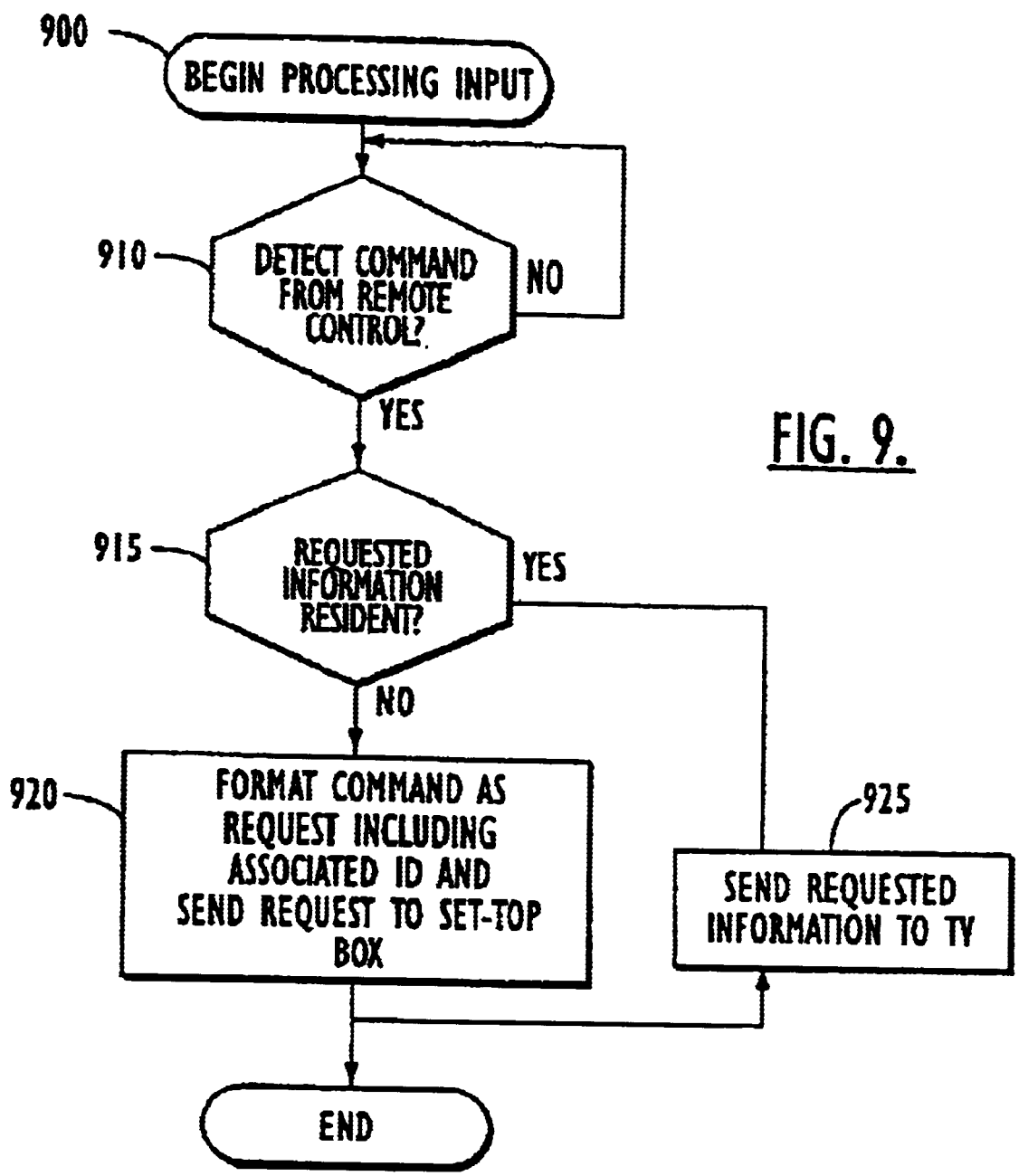
FIG. 9 is a flowchart that illustrates operations of a set-top box in response to requests for information.

FIG. 9 is a flowchart that illustrates operations of a set-top box in response to requests for information. According to FIG. 9, the set-top box begins processing input at block 900. The set-top box waits for a command from the remote control (block 910). When a remote control command is detected (block 910), the set-top box determines if the requested information is resident in the set-top box (block 915). If the information is resident in the set-top box, the set-top box sends the requested information to the TV (block 925). If, however, the requested information is not resident in the set-top box, the set-top box sends a request for the information, including the ID of the set-top box, to the PC (block 920).

Figure 10:
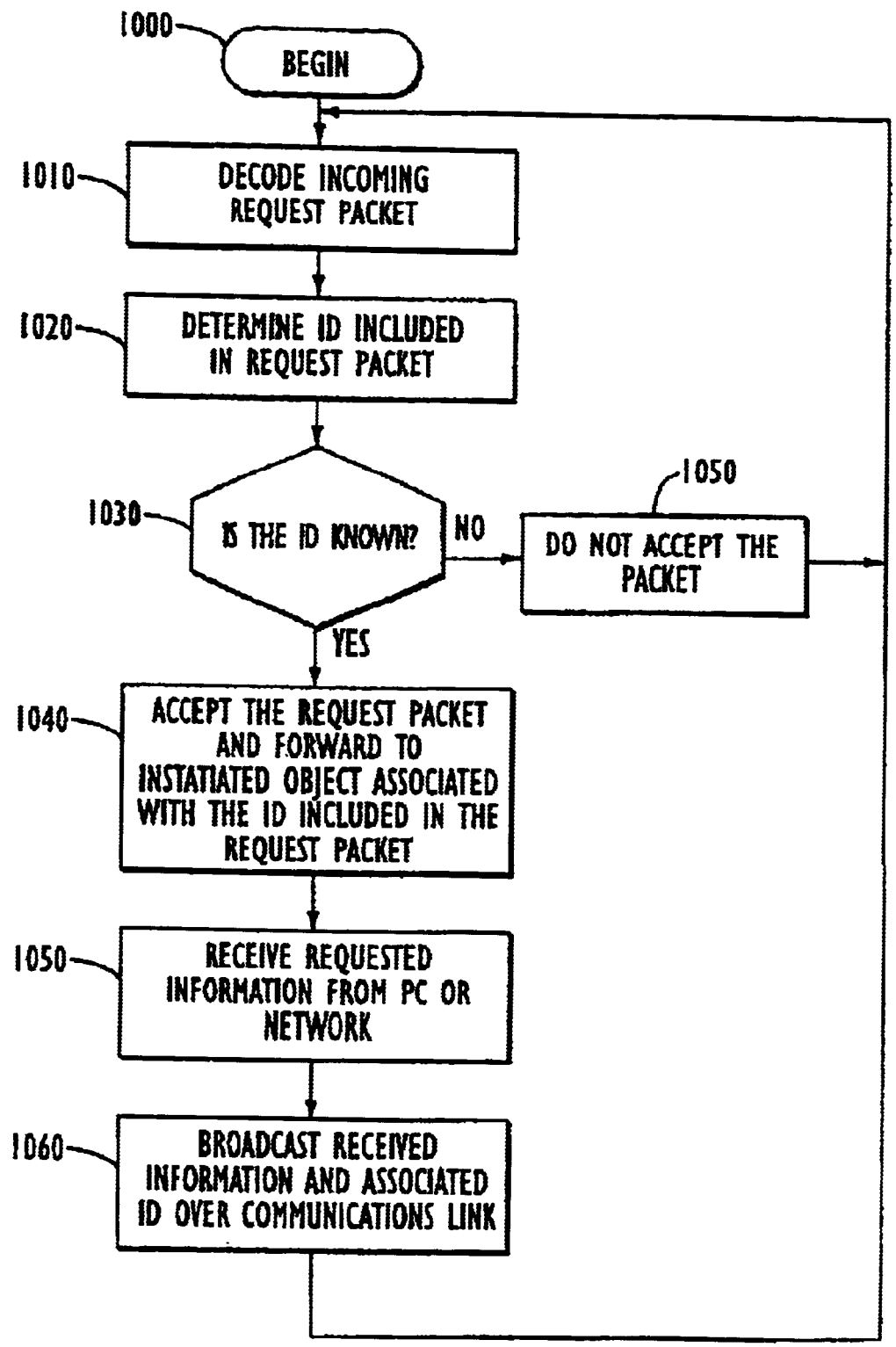
FIG. 10 is a flowchart that illustrates operations of the computer program running on the PC in response to incoming requests for information from set-top boxes.

FIG. 10 is a flowchart that illustrates operations of a computer program running on the PC in response to incoming request packets for information from the set-top boxes. According to FIG. 10, processing begins at block 1000. An incoming request for information is decoded (block 1010) and the ID included in the request is determined (block 1020). If the ID included in the request is not associated with a known set-top box (block 1030), the request is not accepted and processing continues at block 1010.

If, however, the ID included in the request is associated with a known set-top box (block 1030), the request is accepted and provided to the computer program instantiated to handle requests from the set-top box associated with the ID included with the request (block 1040). When the requested information is received (block 1050), the requested information is broadcast over the communications link (block 1060) and processing continues at block 1010.

Figure 11:
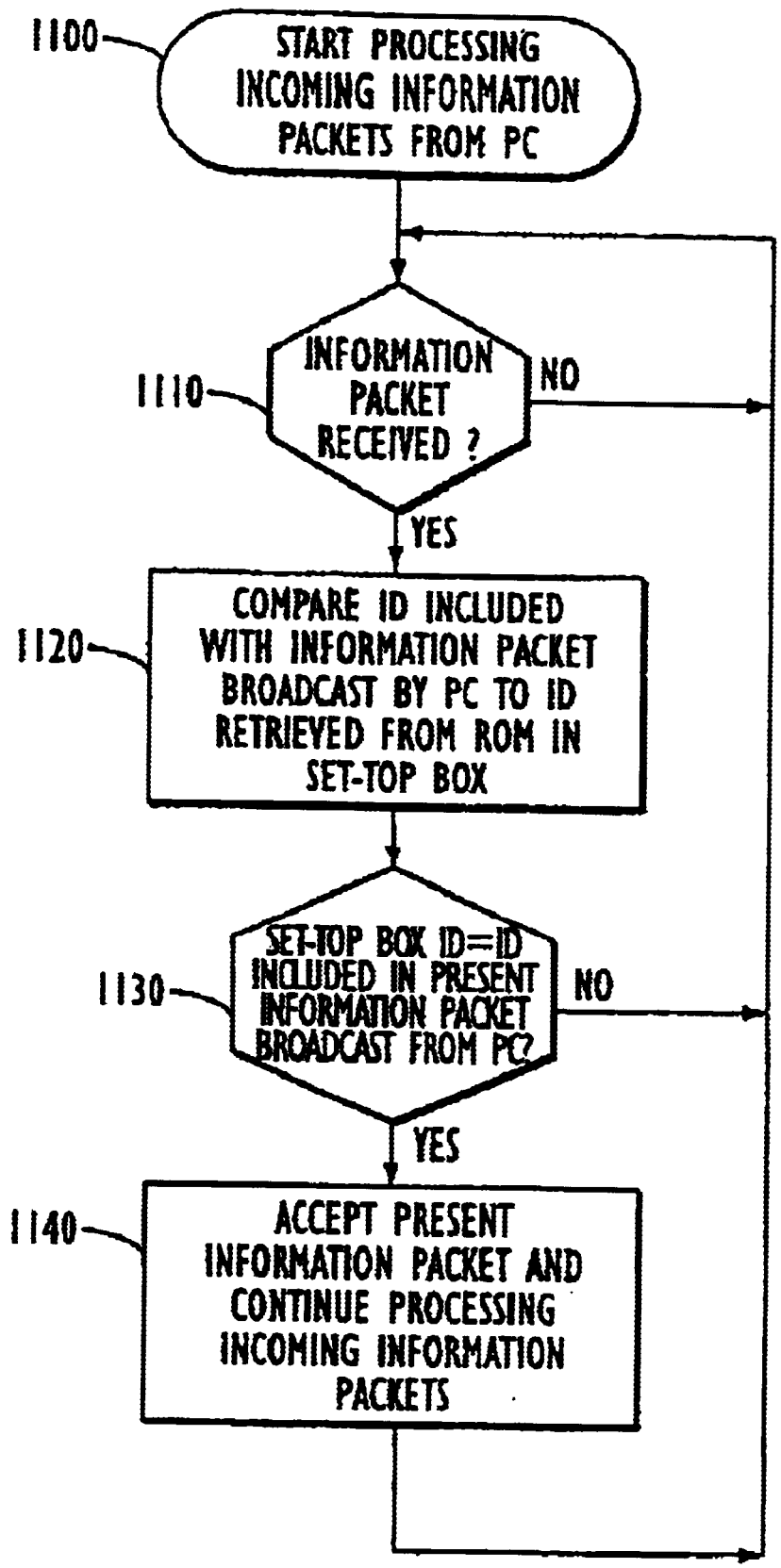
FIG. 11 is a flowchart that illustrates operations of a set-top box in response to information broadcast by the PC.

FIG. 11 is a flowchart that illustrates operations of a set-top box in response to information broadcast by the PC. According to FIG. 11, the processing of incoming packets from the PC begins in block 1100. When a packet is received from the PC (block 1110), the ID included in the packet is compared to the ID of the set-top box (block 1120).

If the ID included in the packet is not equal to the ID of the set-top box (block 1130), the packet is not accepted by the set-top box. The set-top box waits for another incoming packet from the PC (block 1110). If the ID included in the packet is equal to the ID of the set-top box (block 1130), the packet is accepted and the requested information is provided to the TV (block 1140) and processing continues at block 1010.

According to the present invention, set-top boxes are identified by respective Ids. The set-top boxes send requests for information over a communications link to a PC. The requests include the ID of the set-top box that made the request. When the requested information is accessed by the PC, the requested information and the ID of the set-top box that made the request are transmitted over the communications link to the set-top box. Accordingly, multiple set-top boxes may access information from a single residence via an existing PC, thereby allowing a more cost-effective approach than conventional systems.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of providing information from a personal computer to a set-top box over a communications link, the method comprising the steps of:

receiving a request for information from the set-top box at the personal computer, the personal computer and the set-top box being at a single location to which is configured for cable service, wherein the request includes an ID that identifies the set-top box;

accessing the requested information by the personal computer; and transmitting the requested information and the ID that identifies the set-top box from the personal computer to the set-top box over the communications link, the communications link at the single location which is configured for cable service.

2. The method of claim 1 further comprising the steps of:

receiving a second request for second information from a second set-top box at the personal computer, wherein the second request includes a second ID that identifies the second set-top box;

accessing the second requested information by the personal computer; and transmitting the second requested information and a second ID that identifies the second set-top box from the personal computer to the set-top box over the communications link.

3. The method of claim 2, wherein the step of accessing comprises the steps of:

accessing the first requested information based on a first context associated with the first set-top box; and accessing the second requested information based on a second context associated with the second set-top box.

4. The method of claim 2, wherein the step of accessing comprises the steps of:
combining the first request for information and the second request for information at the personal computer; and
accessing the first requested information and the second requested information by the personal computer via a network.

5. The method of claim 3, wherein the step of accessing comprises the step of accessing the first requested information by the personal computer based on a first keyboard status and a first screen status associated with a television connected to a set-top box.

6. The method of claim 1, wherein the step of transmitting comprises the step of broadcasting a plurality of information packets by the personal computer over the communications link, wherein at least one of the information packets includes the ID that identifies the set-top box that requested the information.

7. The method of claim 1, wherein the step of accessing comprises the step of accessing the requested information by the personal computer via a network.

8. The method of claim 1 further comprising the steps of:
sending a power-up packet including the ID of the set-top box from the set-top box to the personal computer over the communications link from the set-top box;
recording the ID of the set-top box included in the power-up packet at the personal computer to designate the set-top box as known; and
transmitting an acknowledgement packet including the ID of the set-top box from the personal computer over the communications link to the set-top box to acknowledge receipt of the power-up packet from the set-top box.

9. A set-top box that interfaces to a television and requests information from a personal computer over a communications link all being at a single location which is configured for cable service, wherein the set-top box is identified by an associated set-top box ID, wherein the set-top box transmits requests for information and the set-top box ID to the personal computer and receives the information and an associated ID from the PC over the communications link, the communications link at the single location which is configured for cable service.

10. The set-top box of claim 9, wherein the set-top box accepts the information from the personal computer if the received associated ID identifies the set-top box.

11. The set-top box of claim 10, wherein the set-top box rejects the information transmitted by the personal computer if the received associated ID does not identify the set-top box.

12. The set-top box of claim 9, wherein the communications link is a coaxial cable.

13. The set-top box of claim 9, wherein the set-top box is configured to be coupled to the personal computer in a house.

14. A system that provides information over a communications link, the system comprising:
a set-top box, configured to be coupled to a television, wherein the set-top box transmits requests for information intended for display on the television, wherein the set-top box has an associated ID that identifies the set-top box; and
a personal computer, configured to be coupled to a network and to the set-top box via the communications link, wherein the personal computer receives the requests for information from the set-top box, accesses the requested information and transmits the requested information and the ID associated with the set-top box to the set-top box, wherein the personal computer, the set-top box, and the communications link are at a single location which is configured for cable service.

15. The system of claim 14, wherein the personal computer receives second requests for information from a second set-top box, wherein the second requests include a second associated ID that identifies the second set-top box, and wherein the personal computer accesses the second requested information and transmits the second requested information and the second ID associated with the second set-top box to the second set-top box.

16. The system of claim 15, wherein the personal computer accesses the first requested information based on a first context associated with the first set-top box and accesses the second requested information based on a second context associated with the second set-top box.

17. The system of claim 15, wherein personal computer combines the first request for information and the second request for information and accesses the first requested information and the second requested information via a network.

18. The system of claim 16, wherein the personal computer accesses the first requested information based on a first keyboard status and a first screen status associated with a television connected to a set-top box.

19. The system of claim 14, wherein the personal computer broadcasts a plurality of information packets over the communication link, wherein at least one of the information packets includes the ID that identifies the set-top box that requested the information.

20. The system of claim 14, wherein the personal computer accesses the requested information via a network if the personal computer determines that the requested information is not stored on the personal computer.

21. A set-top box that interfaces to a television and requests information from a personal computer over a communications link, the set-top box comprising:
means for transmitting requests for information and a set-top box ID to the personal computer, wherein the set-top box is identified by the set-top box ID; and
means for receiving the information and an associated ID from the PC over the communications link, wherein the personal computer, the set-top box, and the communications link are at a single location which is configured for cable service.

22. The set-top box of claim 21, wherein the set-top box accepts the information from by the personal computer if the received associated ID identifies the set-top box.

23. The set-top box of claim 22, wherein the means for receiving comprises means for rejecting the information transmitted by the personal computer if the received associated ID does not identify the set-top box.

24. The set-top box of claim 21, wherein the communications link is a coaxial cable.

25. The set-top box of claim 21, wherein the set-top box is configured to be coupled to the personal computer in a house.

26. A system that provides information over a communications link, the system comprising:
set-top box means for transmitting requests for information intended for display on a television, from the set-top box means, wherein the set-top box has an associated ID that identifies the set-top box; and
personal computer means for receiving the requests for information from the set-top box means and means for accessing the requested information and means for transmitting the requested information and the ID associated with the set-top box means from the personal computer means to the set-top box means over the communications link, wherein the personal computer, the set-top box, and the are at a single location to which cable service is provided.

27. The system of claim 26, wherein the personal computer means receives second requests for information from a second set-top box means, wherein the second requests include a second associated ID that identifies the second set-top box means, and wherein the personal computer means accesses the second requested information and transmits the second requested information and the second ID associated with the second set-top box means to the second set-top box means.

28. The system of claim 27, wherein the personal computer means accesses the first requested information based on a first context associated with the first set-top box means and accesses the second requested information based on a second context associated with the second set-top box means.

29. The system of claim 27, wherein the personal computer means combines the first request for information and the second request for information and accesses the first requested information and the second requested information via a network.

30. The system of claim 28, wherein the personal computer means accesses the first requested information based on a first keyboard status and a first screen status associated with a television connected to a set-top box.

31. The system of claim 26, wherein the personal computer means broadcasts a plurality of information packets over the communication link, wherein at least one of the information packets includes the ID that identifies the set-top box means that requested the information.

32. The system of claim 26, wherein the personal computer means accesses the requested information via a network if the personal computer means determines that the requested information is not stored on the personal computer means.

* * * * *